United States Patent
Martinez Bonastre et al.

(10) Patent No.: US 11,811,073 B2
(45) Date of Patent: Nov. 7, 2023

(54) CATALYST

(71) Applicant: Johnson Matthey Hydrogen Technologies Limited, London (GB)

(72) Inventors: Alejandro Martinez Bonastre, Reading (GB); Jonathan Sharman, Reading (GB); Geoffrey Spikes, Reading (GB)

(73) Assignee: Johnson Matthey Hydrogen Technologies Limited, London (GB)

( * ) Notice: Subject to any disclaimer, the term of this patent is extended or adjusted under 35 U.S.C. 154(b) by 122 days.

(21) Appl. No.: 16/761,873

(22) PCT Filed: Nov. 22, 2018

(86) PCT No.: PCT/GB2018/053374
§ 371 (c)(1),
(2) Date: May 6, 2020

(87) PCT Pub. No.: WO2019/102197
PCT Pub. Date: May 31, 2019

(65) Prior Publication Data
US 2020/0313201 A1    Oct. 1, 2020

(30) Foreign Application Priority Data

Nov. 23, 2017 (GB) ...................................... 1719463

(51) Int. Cl.
*H01M 4/92* (2006.01)
*H01M 4/88* (2006.01)
*H01M 4/86* (2006.01)

(52) U.S. Cl.
CPC ......... *H01M 4/921* (2013.01); *H01M 4/8828* (2013.01); *H01M 4/8882* (2013.01); *H01M 4/925* (2013.01); *H01M 2004/8684* (2013.01)

(58) Field of Classification Search
CPC .................................................... H01M 4/921
See application file for complete search history.

(56) References Cited

U.S. PATENT DOCUMENTS

| | | |
|---|---|---|
| 6,939,370 B2 | 9/2005 | Hartley et al. |
| 2003/0047459 A1 | 3/2003 | Timonov et al. |

(Continued)

FOREIGN PATENT DOCUMENTS

| | | |
|---|---|---|
| EP | 0631337 A2 | 12/1994 |
| EP | 0 955 351 A1 | 11/1999 |

(Continued)

OTHER PUBLICATIONS

Search Report of the Intellectual Property Office of the United Kingdom for GB1719463.0 with search date of May 23, 2018.

(Continued)

*Primary Examiner* — Brian R Ohara
(74) *Attorney, Agent, or Firm* — BakerHostetler (57) ABSTRACT

The use of an electrocatalyst material in an anode catalyst layer, wherein the electrocatalyst material comprises a support material, the support material comprising a plurality of individual support particles or aggregates wherein each individual support particle or aggregate has dispersed thereon (i) first particles and (ii) second particles, wherein: (i) the first particles comprise Pt optionally alloyed with an alloying metal X1; wherein the optional alloying metal X1 is selected from the group consisting of Rh, Ti, Os, V, Co, Ni, Ga, Hf, Sn, Ir, Pd, Mo, Zn, W, Zr and Re; (ii) the second particles consist essentially of a second metal or a second metal compound wherein the second metal is selected from the group consisting of Ir and Ru and the second metal compound comprises IrX2 wherein X2 is selected from the group consisting of Ta, Nb, Ru, Ni and Co; and wherein if the first particles consist of Pt then the second particles do not comprise IrTa; and wherein if the first particles consist of Pt without alloying metal X1 and the second particles consist essentially of a second metal which is Ir, each individual support particle or aggregate of the support (Continued)

material of the electrocatalyst material has dispersed thereon only the said first and second particles; or wherein each individual support particle or aggregate has dispersed thereon (i) first particles and (ii) third particles, wherein: (iii) the third particles comprise Au or a third metal alloy; wherein the third metal alloy is selected from the group consisting of AuX3 and PdX4, wherein X3 is selected from the group consisting of Pt, Pd, Cu, Ir and Sn; and X4 is selected from the group consisting of Hg, Au, Sn, Co, Ni, Ga, In, Zn, W and Pb.

6 Claims, 6 Drawing Sheets

(56) References Cited

U.S. PATENT DOCUMENTS

| | | |
|---|---|---|
| 2004/0013935 A1 | 1/2004 | Ye et al. |
| 2004/0214058 A1* | 10/2004 | Tada ............... H01M 8/04171 |
| | | 429/492 |
| 2006/0258527 A1 | 11/2006 | Yoo et al. |
| 2008/0187813 A1 | 8/2008 | Ye |
| 2009/0023032 A1 | 1/2009 | Obata |
| 2009/0162725 A1 | 6/2009 | Terazono et al. |
| 2009/0253013 A1 | 10/2009 | Onishi |
| 2010/0304240 A1 | 12/2010 | Koike et al. |
| 2011/0177425 A1 | 7/2011 | Yoo et al. |
| 2012/0064435 A1 | 3/2012 | Maruyama et al. |
| 2013/0330650 A1* | 12/2013 | Sharman ............ H01M 4/8657 |
| | | 429/525 |
| 2014/0011119 A1 | 1/2014 | Lee |
| 2014/0186742 A1 | 7/2014 | Yi |
| 2017/0125821 A1 | 5/2017 | Sharman et al. |
| 2017/0200956 A1 | 7/2017 | Nagami et al. |
| 2018/0280878 A1 | 10/2018 | Inoda et al. |
| 2020/0119365 A1* | 4/2020 | Haug ................ H01M 8/1004 |

FOREIGN PATENT DOCUMENTS

| | | |
|---|---|---|
| EP | 2019455 A2 | 1/2009 |
| EP | 2600451 A2 | 6/2013 |
| GB | 2555507 A | 5/2018 |
| JP | 2003-187851 A | 7/2003 |
| JP | 2006-253146 A | 9/2006 |
| JP | 2008-41411 A | 2/2008 |
| JP | 2009-152143 A | 7/2009 |
| JP | 2010-277995 A | 12/2010 |
| JP | 2011-40178 A | 2/2011 |
| JP | 2015-195193 A | 11/2015 |
| JP | 2015190018 A | 11/2015 |
| JP | 2016-35868 A | 3/2016 |
| WO | 0024074 A1 | 4/2000 |
| WO | 2001015247 A2 | 3/2001 |
| WO | 2005123255 A1 | 12/2005 |
| WO | 2013045894 A1 | 4/2013 |
| WO | 2014105407 A1 | 7/2014 |
| WO | 2014184546 A1 | 11/2014 |
| WO | 2017/051894 A1 | 3/2017 |
| WO | 2017/203257 A1 | 11/2017 |
| WO | 2017203257 A9 | 11/2017 |

OTHER PUBLICATIONS

International Search Report of the International Searching Authority for PCT/GB2018/053374 dated Apr. 29, 2019.
Adams, et al., Enhancement Of The Performance And Reliability Of CO Poisoned PEM Fuel Cells, Journal of Power Source, 145 (2005) 55-61.
Divisek, et al., "Components For PEM Fuel Cell Systems Using Hydrogen And CO Containing Fuels", Electrochimica Acta, 43(24) (1998) 3811-3815.
Gottesfeld, et al., "A New Approach To the Problem of Carbon Monoxide Poisoning In Fuel Cells", J. Electrochem. Soc., Accelerated Brief Communication, Oct. 1988, pp. 2651-2652.
Hydrogen Fuel Quality Specifications For Polymer Electrolyte Fuel Cell In Road Vehicles, Published Nov. 2, 2016 85 pages.
Janssen, et al., "Development Of Bilayer Anodes For Improved Reformate Tolerance Of PEM Fuel Cells", Paper To Be Presented At The 2nd European PEFC Forum, (2003), pp. 1-10.
Mandal, et al., "On The Impact Of Water Activity On Reversal Tolerant Fuel Cell Anode Performance And Durability", Journal Of Power Sources, 328, (2016), 280-288.
Murthy, et al., "The Effect Of Temperature And Pressure On the Performance Of A PEMFC Exposed To Transient CO Concentrations", Journal Of Electrochemical Society, (2003), 150 (1) A29-A34.
Ralph, et al., "Catalysis For Low Temperature Fuel Cells", Platinum Metals Rev., (2002) 46(3) 117-135.
Siahrostama, et al., "Enabling Direct H2O2 Production Through Rational Electrocatalyst Design", Nature Materials, 12 (2013) 1137-1143.
Wang, et al., "A Novel Pt/Au/C Cathode Catalyst For Direct Methanol Fuel Cells With Simultaneous Methanol Tolerance And Oxygen Promotion", Electrochemistry Communications, 10 (2008) 831-834.
Wang, et al., "Pt Decorating of PdNi/C As Electrocatalysts For Oxygen Reduction", Electrochimica Acta, 55 (2010) 1519-1522.
Wesselmark, et al., "The Impact Of Iridium On The Stability Of Platinum On Carbon Thin-Film Model Electrodes", Electrochimica Acta, 111 (2013) 152-159.
Yu, et al., "Composite Anode For CO Tolerance Proton Exchange Membrane Fuel Cells", Journal of Power Sources, 105 (2002) 52-57.

* cited by examiner

CATALYST

FIELD OF THE INVENTION

The present invention relates to new electrocatalyst materials and in particular new electrocatalyst materials for use at the anode of a fuel cell.

BACKGROUND OF THE INVENTION

A fuel cell is an electrochemical cell comprising two electrodes separated by an electrolyte. A fuel, e.g. hydrogen, an alcohol such as methanol or ethanol, or formic acid, is supplied to the anode and an oxidant, e.g. oxygen or air, is supplied to the cathode. Electrochemical reactions occur at the electrodes, and the chemical energy of the fuel and the oxidant is converted to electrical energy and heat. Electrocatalysts are used to promote the electrochemical oxidation of the fuel at the anode and the electrochemical reduction of oxygen at the cathode.

Fuel cells are usually classified according to the nature of the electrolyte employed. Often the electrolyte is a solid polymeric membrane, in which the membrane is electronically insulating but ionically conducting. In the proton exchange membrane fuel cell (PEMFC) the membrane is proton conducting, and protons, produced at the anode, are transported across the membrane to the cathode, where they combine with oxygen to form water.

A principal component of the PEMFC is the membrane electrode assembly (MEA), which is essentially composed of five layers. The central layer is the polymer ion-conducting membrane. On either side of the ion-conducting membrane there is an electrocatalyst layer, containing an electrocatalyst designed for the specific electrocatalytic reaction. Finally, adjacent to each electrocatalyst layer there is a gas diffusion layer. The gas diffusion layer must allow the reactants to reach the electrocatalyst layer and must conduct the electric current that is generated by the electrochemical reactions. Therefore, the gas diffusion layer must be porous and electrically conducting.

Conventionally, the MEA can be constructed by a number of methods outlined hereinafter:
  (i) The electrocatalyst layer may be applied to the gas diffusion layer to form a gas diffusion electrode. A gas diffusion electrode is placed on each side of the ion-conducting membrane and laminated together to form the five-layer MEA;
  (ii) The electrocatalyst layer may be applied to both faces of the ion-conducting membrane to form a catalyst coated ion-conducting membrane. Subsequently, a gas diffusion layer is applied to each face of the catalyst coated ion-conducting membrane.
  (iii) An MEA can be formed from an ion-conducting membrane coated on one side with an electrocatalyst layer, a gas diffusion layer adjacent to that electrocatalyst layer, and a gas diffusion electrode on the other side of the ion-conducting membrane.

Typically, tens or hundreds of MEAs are required to provide enough power for most applications, so multiple MEAs are assembled to make up a fuel cell stack. Flow field plates are used to separate the MEAs. The plates perform several functions: supplying the reactants to the MEAs; removing products; providing electrical connections; and providing physical support.

Electrocatalysts for water oxidation and oxygen evolution reactions are typically based on transition metals such as platinum or their oxides or alloys with one or more metals. The platinum-containing catalyst can be in the form of unsupported nanometer sized particles (for example metal blacks) or can be deposited as discrete nanoparticles onto a support material (a supported catalyst) leading to a very high catalyst surface area. Electrocatalysts can also be in the form of coatings or extended films deposited onto a support material. There is a continual search for catalysts that have improved activity and/or stability, and that therefore utilise the expensive platinum catalyst more effectively. This enables the MEA performance to be increased or the loading (and therefore cost) of the catalyst employed in the MEA to be decreased, or a combination of both benefits.

As is known, particularly problematic at the anode is protection of the Pt-containing catalysts during cell reversal events and in the presence of CO. During operation, if the anode is starved of fuel (particularly hydrogen starvation), rapid changes in cell voltage can occur. In such situations, the current in the cell is sustained not by the hydrogen oxidation reaction, but by carbon corrosion reactions. The resulting corrosion leads to failures in the cell (including failures of the electrocatalyst, carbon support, gas diffusion layer and anode flow field plate if carbon based). In turn, this leads to shorting of the MEA due to the heat generated. The failures may be irreversible and may lead to a decrease in the fuel cell lifetime.

Prolonging water electrolysis during hydrogen starvation and preventing the anode half-cell potential increase beyond 1.8V is currently achieved by adding an oxygen evolution reaction (OER) catalyst into the anode catalyst layer. In this way, the driving potential for carbon corrosion is minimised and the cell is protected from carbon corrosion at the anode during periods of fuel starvation. These are called cell reversal tolerant catalysts. As reported by Mandal et al. (Journal of Power Sources 328, October 2016, 280) the most used type of OER catalysts in polymer electrolyte membrane (PEM) fuel cells include $IrO_2$, $RuO_2$, PtIr, IrRu and PtIrRu. EP2600451 A2 discloses the use of alloy catalysts such as $IrRu_4$/C. At the anode, this material exhibited superior durability (circa 120 times better) over Pt/C anode under cell reversal conditions. This is because during the cell reversal condition, $IrRu_4$ promoted the water oxidation reaction so that the carbon oxidation reaction was avoided and hence the life time of the fuel cell was extended. Another approach reported by Ralph et al. (Platinum Review Metals, 2002, 46, 3) is the use of two different catalysts mixed together or printed in a two-layer configuration. In particular, a Pt/C catalyst with a $RuO_2$/C catalyst printed from an ink, to produce a composite layer with the two catalysts, was effective. Their work reported the reduction of $CO_2$ production on the anode catalyst layer during cell reversal. As a result, the carbon support of the active Pt/C catalyst was protected.

A wide range of catalyst concepts have been investigated for improved oxygen evolution activity.

In $H_2$-fed fuel cells, the concentration of (CO) in ($H_2$) can range from circa 0.2 ppm up to a few tens of ppm (Hydrogen fuel quality specifications for polymer electrolyte fuel cells in road vehicles, Fuel cell technologies office US department of energy, 2016). When CO comes into contact with the anode catalyst, it adsorbs onto the catalyst surface and blocks active sites for $H_2$ oxidation. As a consequence, the anode reaction is inhibited due to catalyst poisoning and fuel cell performance decreases. Overcoming the CO poisoning problem is a technical challenge for anode catalysts in fuel cells and different groups have proposed possible solutions that are capable of the oxidation of CO to carbon dioxide $CO_2$.

For instance, a CO poisoned electrode can be regenerated by periodic pulsed oxidation (W. A. Adams, J. Blair, K. R. Bullock, C. L. Gardner, J. Power Sources 145 (2005) 55-61). In this approach the voltage of the anode catalyst is increased until adsorbed CO is oxidised to $CO_2$. Another approach is to increase the cell temperature and this has been reported to have better CO tolerance due to a weaker adsorption of CO on the catalyst surface, usually platinum, (M. Murthy, M. Esayian, W.-k. Lee, J. W. Van Zee, J. Electrochem. Soc. 150 (2003) 29-34). Other groups have solved this problem with the use of a two-layer anode catalyst layer. In this case a first catalyst layer contains a CO tolerant catalyst such as PtRu/C or $Au/TiO_2$. This first layer acts as a filter to the second layer in between the first layer and the membrane. As a result, the $H_2$ fuel that reaches the second layer is free of CO (H. Yu, Z. Hou, B. Yi, Z. Lin, J. Power Sources 105 (2002) 52-57). The addition of liquid oxidants such as hydrogen peroxide ($H_2O_2$) to the anode fuel has also been reported to improve CO tolerance level (J. Divisek, H. F. Oetjen, V. Peinecke, V. M. Schmidt, U. Stimming, Electrochim. Acta 43 (1998) 3811-3815). In this method $H_2O_2$ is mixed with the $H_2$ fuel and transformed to $O_2$, which reacts with CO to form $CO_2$.

A different approach to decrease CO concentration in $H_2$ is the injection of a small amount of air (i.e. 1 to 5% air) into the anode fuel stream (S. Gottesfeld, J. Pafford, J. Electrochem. Soc. 135 (1988) 2651-2652). This is known as air bleeding. In this approach the oxygen in air oxidizes CO to form $CO_2$. Injection of a small amount of oxygen is an effective method for reducing CO poisoning and thereby extending fuel cell operating duration. Although the benefits of air bleeding for the performance of CO-poisoned PEM fuel cells are known, it causes cell degradation in the long-term because not all the $O_2$ molecules react with CO. The un-reacted $O_2$ molecules chemically react with $H_2$ leading to spontaneous combustions in exothermic reactions. The heat generated in the catalyst layer leads to particle sintering and hence decreases performance due to a decrease in catalyst surface area. In addition, the number of air bleed interventions has an impact on catalyst stability and needs to be minimised during the life time of the fuel cell. Hence if an air bleed is to be applied it is desired that the oxygen concentration in the bleed is as low as possible. i.e. <1% air, so the reactions mentioned above that lead to the degradation of the anode catalyst do not occur.

It would be useful to be able to provide further catalysts suitable for protecting the anode during adverse or sub-optimal operating conditions such as during cell reversal or in the presence of CO. In particular, it would be useful to provide anode electrocatalyst layers capable of extending the durability of fuel cell operation.

SUMMARY OF THE INVENTION

It is therefore the object of the present invention to provide an electrocatalyst material which, when used at the anode of a fuel cell, can improve the fuel cell performance and durability or prolong the lifetime of fuel cell operation. It is a further object of the invention to provide such benefits when the fuel cell is operated under a range of conditions, including sub-optimal operating conditions such as during fuel starvation events and in the presence of CO.

Generally, the inventors propose the use of a hybrid electrocatalyst material capable of performing multiple reactions during operation. Using this approach, the invention aims to protect active Pt-based anode catalyst particles from degradation or damage by providing a second catalytic particle in close proximity to the active Pt-based particles. In the present invention, particularly close proximity of the two kinds of catalyst nanoparticle is achieved by dispersing the two kinds of catalyst particles on each individual primary support particle or aggregate. Put differently, each individual primary support particle or aggregate has each of the two kinds of catalyst particles dispersed thereon. This approach is believed to be improved over reports of mixtures of catalyst particles dispersed on separate supports. Each kind of catalyst particle retains a large surface area due to its particulate, highly dispersed nature. In this way, it is believed that the present kind of electrocatalyst material is improved over layered materials because the surface area available for catalytic activity is retained. It is considered that the combination of high surface area and proximity can improve the fuel cell performance and durability, particularly at the anode.

Thus, in a first general aspect, the invention concerns electrocatalyst materials for use at an anode in a fuel cell which maintains anode activity during cell polarity reversal events or high voltage operation. This is due to the incorporation of a water oxidation catalyst such as iridium nanoparticles, in close proximity to the active Pt-containing catalyst. When the anode is starved of fuel (and particularly starved of hydrogen), the water oxidation catalyst can act to prevent carbon corrosion events. Due to the close proximity of the active Pt-containing particles and the water oxidation catalyst particles, corrosion of the catalyst support particles can be prevented or reduced significantly.

Accordingly, the first aspect provides the use of an electrocatalyst material in an anode catalyst, wherein the electrocatalyst material comprises a support material, the support material comprising a plurality of individual support particles or aggregates wherein each individual support particle or aggregate has dispersed thereon (i) first particles and (ii) second particles, wherein:
(i) the first particles comprise Pt optionally alloyed with an alloying metal X1;
  wherein the optional alloying metal X1 is selected from the group consisting of Rh, Ti, Os, V, Co, Ni, Ga, Hf, Sn, Ir, Pd, Mo, Zn, W, Zr and Re;
(ii) the second particles consist essentially of a second metal or a second metal compound wherein the second metal is selected from the group consisting of Ir and Ru and the second metal compound comprises IrX2 wherein X2 is selected from the group consisting of Ta, Nb, Ru, Ni and Co; and
wherein if the first particles consist of Pt then the second particles do not comprise IrTa; and wherein if the first particles consist of Pt without alloying metal X1 and the second particles consist essentially of a second metal which is Ir, each individual support particle or aggregate of the support material of the electrocatalyst material has dispersed thereon only the said first and second particles.

Particularly suitable for use in the first aspect is an electrocatalyst material which comprises a support material, the support material comprising a plurality of individual support particles or aggregates wherein each individual support particle or aggregate has dispersed thereon (i) first particles and (ii) second particles, wherein:
(i) the first particles comprise Pt optionally alloyed with an alloying metal X1;
  wherein the optional alloying metal X1 is selected from the group consisting of Rh, Ti, Os, V, Hf, Sn, Pd, Mo, W, Zr and Re; and
(ii) the second particles are defined as follows:

a. second particles consist essentially of Ru or a second metal compound comprising IrX2 wherein X2 is selected from the group consisting of Ta, Nb, Ru, Ni and Co; and wherein if the first particles consist of Pt then the second particles do not comprise IrTa.

In the first aspect, if the first particles consist of Pt i.e. the first particles do not include an alloying metal, then the second particles do not comprise IrTa.

Suitably, in the electrocatalyst material described in relation to the first aspect, X1 is selected from the group consisting of Rh, Ti, Os, V, Hf, Sn. Particularly suitably, X1 is selected from the group consisting of Rh and Os.

Suitably, in the electrocatalyst material described in relation to the first aspect, X2 is selected from the group consisting of Ta, Nb and Ru. Particularly suitably, X2 is selected from Ta and Nb.

Suitably, in the electrocatalyst material described in relation to the first aspect, the second particles may consist essentially of IrX2.

Suitably, in the electrocatalyst material described in relation to the first aspect the first particles comprise Pt without X1. Particularly in such cases, it is suitable that each individual support particle or aggregate of the support material of the electrocatalyst material has dispersed thereon only first and second particles, the first particles comprising Pt without X1 and the second particles consisting essentially of a second metal which is Ir. In this case it is suitable that the support material has no other particles dispersed thereon, other than the first and second particles i.e. other kinds of metal or catalytic particles apart from Pt and Ir are not included.

Suitably, the electrocatalyst material described in relation to the first aspect comprises first particles consisting of Pt alloyed with Rh; and second particles consisting essentially of a second metal which is Ir, preferably consisting of Ir.

In a second general aspect the invention concerns electrocatalyst materials used at an anode which provide improved CO tolerance. Put differently, the electrocatalyst materials with which the second general aspect is concerned maintain anode activity in the presence of CO. This is achieved by the incorporation of a peroxide forming catalyst such as a Pd-alloy which is capable of forming hydrogen peroxide in close proximity to the primary Pt-containing catalyst. The $H_2O_2$, because it is in close proximity to the adsorbed CO, can react with the CO to form $CO_2$. The $H_2O_2$ is decomposed to form $H_2O$. In this way, active sites are freed for the hydrogen oxidation reaction that occurs at the anode. Similar benefit can be obtained when the fuel cell is operated as a direct alcohol fuel cell. In such fuel cells, CO oxidation is needed to make $CO_2$ from the alcohol e.g. methanol. The anode potential should raised high enough to oxidise CO to $CO_2$, which compromises (lowers) the overall cell voltage. Thus, the present catalysts are suitable. The primary alcohol hydrocarbons in such cells may include methanol, ethanol, propanol, butanol and the like; or may suitably have a chain length higher than 2. i.e. ethanol, propanol, butanol and the like. Accordingly, the present invention has the advantage of avoiding the addition of liquid peroxide to the fuel thereby improving the system design and lowering cost. The catalyst described in this general aspect further allows the operation of an electrochemical cell under an air bleed mode with lower than usual oxygen content.

Accordingly, the second aspect provides the use of an electrocatalyst material in an anode catalyst, wherein the electrocatalyst material comprises a support material, the support material comprising a plurality of individual support particles or aggregates wherein each individual support particle or aggregate has dispersed thereon (i) first particles and (ii) third particles, wherein:
  (i) the first particles comprise Pt optionally alloyed with an alloying metal X1;
    wherein the optional alloying metal X1 is selected from the group consisting of Rh, Ti, Os, V, Co, Ni, Ga, Hf, Sn, Ir, Pd, Mo, Zn, W, Zr and Re;
  (ii) the third particles comprise Au or a third metal alloy;
    wherein the third metal alloy is selected from the group consisting of AuX3 and PdX4, wherein X3 is selected from the group consisting of Pt, Pd, Cu, Ir and Sn; and X4 is selected from the group consisting of Hg, Au, Sn, Co, Ni, Ga, In, Zn, W and Pb.

Particularly suitable for use in the second aspect is an electrocatalyst material which comprises a support material, the support material comprising a plurality of individual support particles or aggregates wherein each individual support particle or aggregate has dispersed thereon (i) first particles and (ii) third particles, wherein:
  (i) the first particles comprise Pt optionally alloyed with an alloying metal X1;
    wherein the optional alloying metal X1 is selected from the group consisting of Rh, Ti, Os, V, Hf, Sn, Pd, Mo, W, Zr and Re; and
  (ii) the third particles comprise a third metal alloy;
    wherein the third metal alloy is selected from the group consisting of AuX3 and PdX4, wherein X3 is selected from the group consisting of Pt, Pd, Cu, Ir and Sn; and X4 is selected from the group consisting of Hg, Au, Sn, Co, Ga, In, Zn, W and Pb.

Suitably, in the electrocatalyst material described in relation to the second aspect X1 is selected from the group consisting of Rh, Ti, Os, V, Hf, Sn. Particularly suitably, X1 is selected from the group consisting of Rh and Os.

Suitably, in the electrocatalyst material described in relation to the second aspect the first particles comprise Pt without X1.

Suitably, in the electrocatalyst material described in relation to the second aspect X3 is chosen from Pd and Sn, and X4 is chosen from Au and Sn. Suitably, the third particles comprise AuPd.

Suitably, in the electrocatalyst material described in relation to either the first or second aspects the ratio of first metal to alloying metal X1 is from 5:1 to 1:5.

Suitably, in the electrocatalyst material described in relation to either the first or second aspects the first particles have a mean average particle size in the range of from 2 to 14 nm.

Suitably, in the electrocatalyst material described in relation to either the first or second aspects the second and/or third particles have a mean average particle size in the range of from 0.5 to 10 nm.

Suitably, the electrocatalyst material discussed in either the first or second aspects is used in an electrochemical cell, such as a fuel cell.

Also provided herein are processes for the preparation of the electrocatalyst material described in relation to any one of the preceding aspects, and a catalyst layer, gas diffusion electrode and ion-conducting membrane comprising the electrocatalyst material described in relation to any one of the first or second aspects.

The invention will now be described with particular reference to the accompanying non-limiting figures and examples. The scope of the invention is defined in the claims. Preferred features described herein may be applicable to all aspects, unless specifically described otherwise.

DETAILED DESCRIPTION OF THE INVENTION

Preferred and/or optional features of the invention will now be set out. Any aspect of the invention may be combined with any other aspect of the invention, unless the context demands otherwise. Any of the preferred or optional features of any aspect may be combined, singly or in combination, with any aspect of the invention, unless the context demands otherwise.

As used herein, the phrase "particle A consists essentially of Z" means that A substantially comprises Z, that is particle A contains a predominant amount of Z. In general, such particles A may not intentionally include constituents other than Z. Thus, particle A may contain small amounts of constituents other than Z, such as but not limited to impurities or limited amounts of e.g. surface oxidation. In some embodiments, particles that "consist essentially of" an element or combination of elements may be made up of at least 80%, such as at least 85% or at least 90% of that element or combination of elements. In some embodiments, such particles may be made up of at least 95%, such as 97% or more, of the element or combination of elements.

Support Material

The support material comprises a plurality of individual support particles or aggregates. By the phrase 'individual support particle or aggregate', is meant the smallest single moiety which is unable to be broken down into two or more smaller moieties. The term 'aggregate' is used to refer to primary particles that have associated into a cluster composed of two or more primary particles, and which are permanently bound to each other; the total specific surface area of the aggregate is less than the sum of the surface areas of the primary particles before they were aggregated. Two or more individual support particles or aggregates can combine to provide an agglomerate. Agglomerates comprise loosely held individual support particles or aggregates held together by weak forces and can be readily broken down into the individual support particles or aggregates under imposition of low energy agitation.

The individual support particles or aggregates suitably have a mean particle or aggregate size between 5 nm and 500 nm and the agglomerates into which they can associate have a surface area of greater than 20 $m^2/g$ when measured by the BET nitrogen sorption method.

The support material may be carbon, for example, a commercially available carbon black (such as available form Cabot Corp. (Vulcan XC72R) and Akzo Nobel (Ketjen black series)) or a graphitised version of these carbon blacks or other commercially available carbon blacks such as acetylene blacks (e.g. those available from Denka). The carbon may also be one specifically designed for use in a fuel cell, such as those described in WO2013/045894. Alternatively, the support material may be a metal oxide (e.g. titania, zirconia, silica or a mixed oxide, in particular a conductive mixed oxide such as niobia-doped titania, phosphorus-doped tin oxide and mixed platinum group metal oxides or mixed metal oxides as disclosed in WO2012/080726), a carbide (e.g. tungsten carbide, molybdenum carbide or titanium carbide, suitably tungsten carbide or titanium carbide), a nitride, in particular a conductive nitride (e.g. titanium nitride or titanium aluminium nitride).

First Particles

The first particles comprise a first metal optionally alloyed with an alloying metal, X1.

Suitably, the first metal is platinum.

Suitably, the first particles comprise platinum; preferably consisting essentially of platinum. In some instances, the first particles consist of platinum.

Suitably, the alloying metal X1 is one or more selected from the group consisting of rhodium, titanium, osmium, vanadium, cobalt, nickel, gallium, hafnium, tin, iridium, palladium, molybdenum, zinc, tungsten, zirconium and rhenium.

More suitably, the alloying metal X1 is one or more selected from the group consisting of rhodium, titanium, osmium, vanadium, hafnium, tin, palladium, molybdenum, tungsten, zirconium and rhenium.

Preferably, the alloying metal X1 is one or more selected from the group consisting of rhodium, titanium and osmium.

Suitably, when the alloying metal X1 is present, the atomic ratio of first metal to alloying metal X1 is from 5:1 to 1:5, and preferably 3:1 to 1:3.

While the first particles are essentially present as a metal or an alloy of two metals, there may be some surface oxidation on the particles.

Second Particles

The second particles comprise a second metal or second metal compound, wherein the second metal is iridium or ruthenium and the second metal compound comprises an iridium-containing material IrX2.

In one embodiment, the electrocatalyst material comprises second particles consisting essentially of iridium or ruthenium, and preferably consisting of iridium.

In a further embodiment, the electrocatalyst material comprises second particles consisting essentially of a second metal compound IrX2.

Suitably X2 is selected from the group consisting of tantalum, niobium, ruthenium, nickel and cobalt. Preferably, X2 is selected from the group consisting of tantalum, niobium and ruthenium, and particularly preferably X2 is tantalum.

Where the second particles are essentially present as the metal, there may be some surface oxidation on the particles. While the second particles are essentially present as a metal or metal compound, there may be some surface oxidation on the particles. The second metal compound in particular may be present in any suitable form, such as an alloy or a mixed metal oxide (mixed crystal).

Third Particles

The third particles comprise a third metal or a third metal alloy.

Suitably, the third metal is Au. Au may suitably be used when alcohol oxidation is wanted. That is, Au may be particularly suitable for use when the fuel cell is a direct alcohol fuel cell with primary alcohol hydrocarbons. i.e. methanol, ethanol, propanol, butanol and the like, and particularly suitably where the primary alcohol hydrocarbon has a chain length greater than 2.

Suitably, the third metal alloy is an alloy chosen from AuX3 and PdX4. In this context, it is noted that the third metal is not suitably Pd, though the third metal alloy is suitably an alloy of Pd.

Suitably, X3 is selected from the group consisting of Pt, Pd, Cu, Ir and Sn. Preferably, X3 is chosen from Pd and Sn.

Suitably, X4 is selected from the group consisting of Hg, Au, Sn, Co, Ni, Ga, In, Zn, W and Pb. Preferably, X4 is chosen from Au and Sn.

Preferably the third metal alloy is AuPd (i.e. AuX3 wherein X3 is Pd or PdX4 wherein X4 is Au).

While the third particles are essentially present as a metal or an alloy of two metals, there may be some surface oxidation on the particles.

Particle Size

Suitably, the first particles have a mean average particle size in the range of from 2 to 14 nm, preferably from 3 to 9 nm.

The mean average particle size is determined by examination in the transmission electron microscope (TEM) and directly measuring the metal particles sizes. Typically, one to two hundred particles are measured in this way.

The second and third particles may have a different mean average particle size compared to the first particles. Suitably the second or third particles may have a mean average particle size in the range of from 0.5 to 10 nm, preferably from 1 to 6 nm. Suitably the second or third particles may have a mean average particle size in the range from 0.5 to 30 nm, preferably from 1 to 20 nm. The mean average particle size is determined using the method as hereinbefore described for the first particles.

In general, particles made up of at least two kinds of metal atoms (e.g. alloys) are expected to be larger than particles made up of only one kind of metal atom. Thus, in instances where the second or third particles are made up of more than one kind of metal atom and the first particles are Pt, the second or third particles may have a larger mean average particle size than the Pt particles. Conversely, in instances where the first particles are a Pt alloy and the second or third particles contain only one kind of metal atom, the first particles may generally be larger than the second or third particles.

Electrocatalyst Material

Figures 1A, 1B:
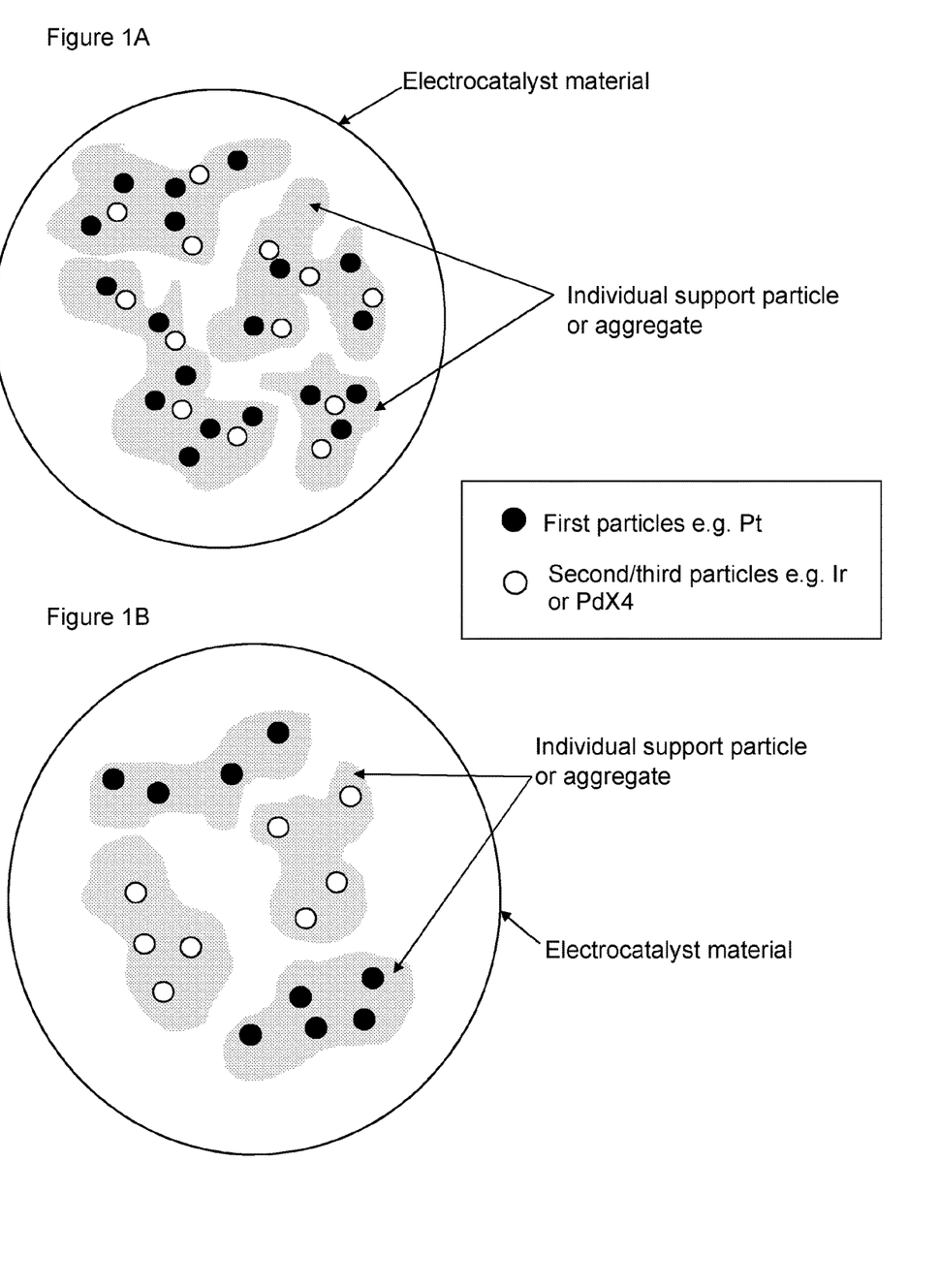
FIG. 1A is a schematic diagram of an electrocatalyst material according to the claims. The carbon support particles are shown in grey. The two different kinds of catalyst particles are represented with black and white circles e.g. Pt (black) and Ir (white) metal nanoparticles.
FIG. 1B is a schematic diagram of a prior art electrocatalyst made with a mixture of two different catalyst powders. The carbon support particles are shown in grey. The two different kinds of catalyst particles are represented with black and white circles e.g. Pt (black) and Ir (white) metal nanoparticles.

The electrocatalyst material described herein comprises the support material wherein each individual support particle or aggregate of the support material has dispersed thereon first particles, together with second or third particles. Suitably, all first particles and all second or third particles are in direct contact with the individual support particle or aggregate of the support material. FIG. 1A shows a schematic diagram showing both first particles and second or third particles being supported on each individual support particle or aggregate of the support material. Thus, each individual support particle or aggregate of the support material has two kinds of particle dispersed thereon: first and second particles, or first and third particles. Individual support particles or aggregates of the support particles may in some embodiments have each of first, second and third particles dispersed thereon.

The total platinum group metal loading in the electrocatalyst material is suitably from 20 to 70 wt % and preferably from 30 to 60 wt % based on the total weight of the electrocatalyst material.

Use

The electrocatalyst materials described herein have been found to be particularly suited for use at the anode i.e. as an anode catalyst. Thus, in particularly preferred embodiments the electrocatalyst materials described herein are used as an anode catalyst layer.

Figure 5A:
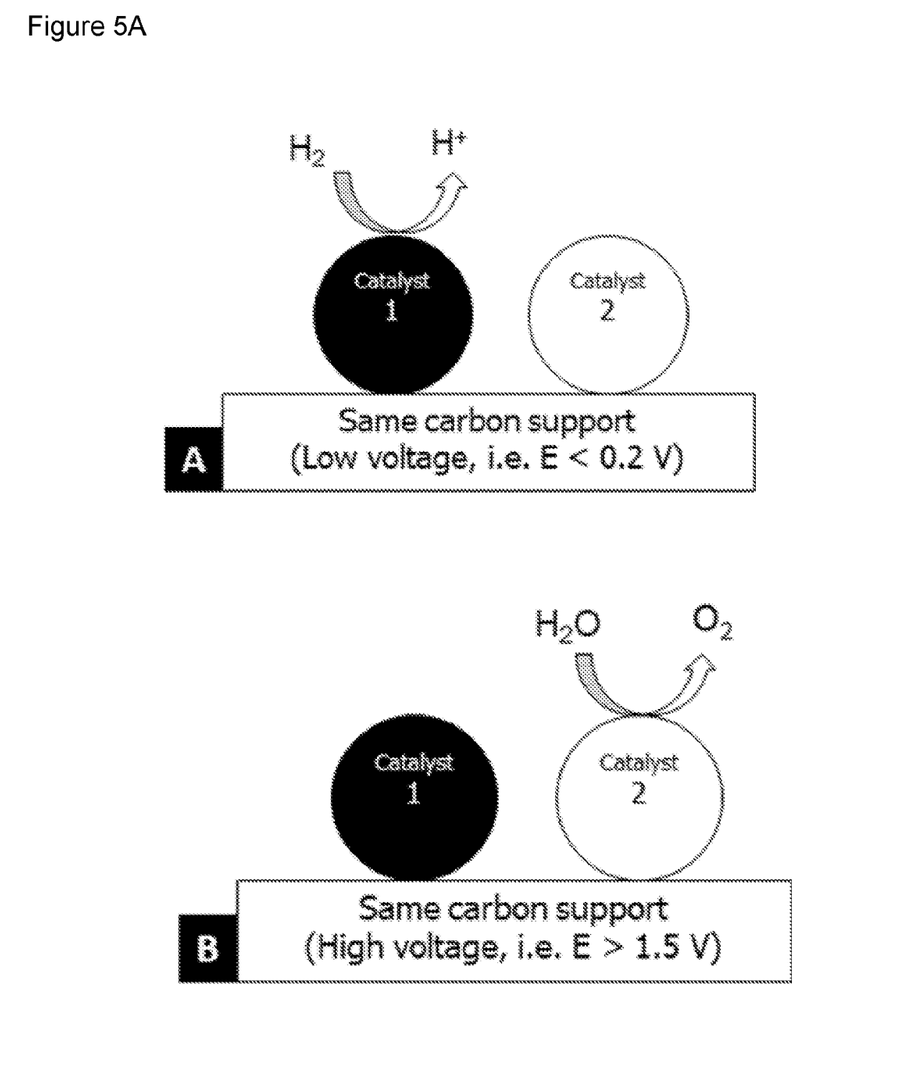
FIG. 5A is a schematic diagram showing activity of a catalyst according to the first general aspect. Part A represents the operation under low cell voltage whereas part B represents function of the catalyst in this invention under high cell voltages. Cell voltages are referred vs RHE.

FIG. 5A schematically represents the expected operation of the first general aspect in which the electrocatalyst comprises first and second particles. Catalyst particle 1 (shown as a black circle) represents a first particle, containing Pt. Catalyst particle 2 (shown as a white circle) represents a second particle e.g. Ir. The two particles are each disposed on the same carbon support particle (shown as a rectangle). They are close to each other in space, but may or may not be touching one another. In part A, under normal operating conditions catalyst 1 acts to transform $H_2$ molecules into $H^+$ ions (protons). This occurs where there is a sufficient provision of $H_2$ to the anode. The potential of the electrode is usually low, such as less than about $0.2V_{SHE}$. At such times, catalyst 2 may also oxidise hydrogen to protons, but is not as active for this reaction as catalyst 1. When there is fuel starvation e.g. hydrogen starvation (part B), catalyst 2 acts to transform $H_2O$ into $O_2$. Catalyst 1 may also evolve some oxygen, but is not as active for this reaction as catalyst 2. This means that the anode is still operating (passing current) but the contribution of carbon corrosion to the overall current is very small. The catalyst 2 provides a protective function to the anode. The electrode potential is usually high when oxygen evolution takes place, such as more than $1.5V_{SHE}$. It is noted that the indicated potentials are not limiting but are provided as representative or indicative values only. When hydrogen supply returns, the catalyst operation can continue as shown in part A and as discussed above.

Figure 5B:
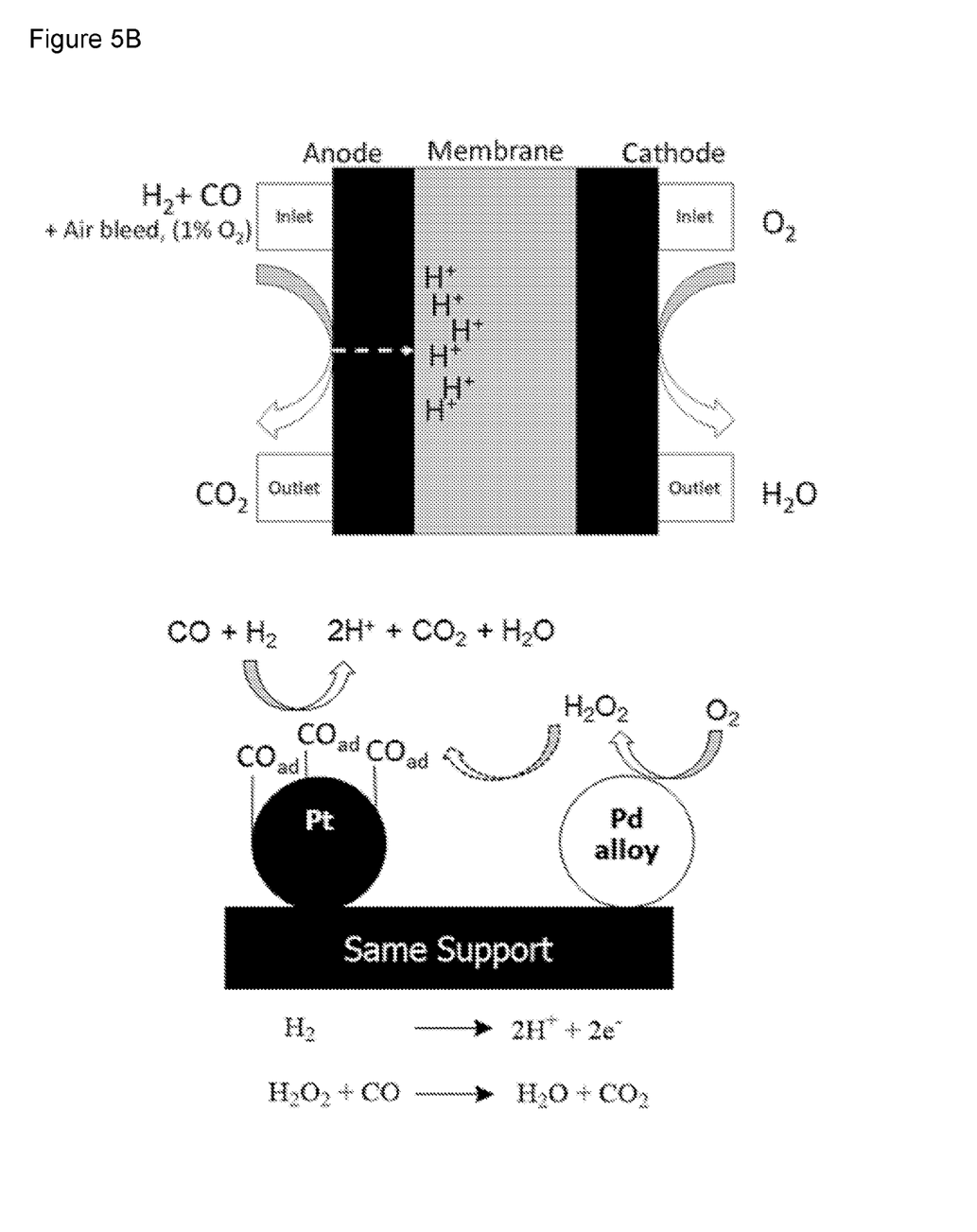
FIG. 5B is a schematic diagram showing activity of a catalyst according to the second general aspect.

FIG. 5B schematically represents the expected operation of the second general aspect in which the electrocatalyst comprises first and third particles. FIG. 5B shows in its upper part further details of the fuel cell. In particular, the anode and cathode catalyst layers are shown as black rectangles, separated by a grey membrane. Hydrogen with CO is fed into the anode. Under standard procedures as explained above, a small amount of air bleed is also included containing e.g. 1% oxygen. The anode outputs $CO_2$. At the cathode, $O_2$ is transformed to $H_2O$.

The electrocatalyst according to the second general aspect is shown below the fuel cell in FIG. 5B. Here, the active Pt-containing catalyst is shown as a black circle. The active Pt-containing catalyst is labelled "Pt" but in accordance with the description of the first particles, it may be a Pt alloy. The third particles are shown as a white circle, labelled Pd-alloy but, as will be understood, refers to the kinds of third particles defined herein, and the particular kind of third particles employed will depend on the kind of reaction that is wanted. The first and third particles are each located on the same support, shown as a black rectangle, in close proximity to one another.

As shown, the first particle transforms $H_2$ into protons. CO may become adsorbed to the first particles thereby reducing the catalytic efficiency (adsorbed CO is shown as $CO_{ad}$). The third particle in this case is a peroxide forming catalyst and transforms $O_2$ into $H_2O_2$. The $H_2O_2$, because is in close proximity to the adsorbed CO, can react with the adsorbed CO to form $CO_2$ and $H_2O$. Thus, active sites are freed for the hydrogen oxidation reaction. The catalytic reactions are also shown underneath FIG. 5B.

Accordingly, an electrocatalyst according to the second general aspect may be suitable for providing increased CO tolerance. An electrocatalyst according to the second general aspect may also be suitable in alcohol oxidation reactions, particularly when Au is included in the third particles.

Processes

The invention further provides a process for the preparation of the electrocatalyst material of the invention. The process generally comprises the steps of:
(A) providing the first particles on the support material; and
(B) providing the second particles on the support material; or
(C) providing the third particles on the support material.

Suitably, the first particles may be applied to the support material before the second or third particles are applied to the support material. Alternatively, the second or third particles may be applied to the support material before the first particles are applied to the support material. That is, the order in which the particles are applied to the support material is not particularly limited. Usefully, if an electrocatalyst material includes only one kind of alloyed particle, the alloyed particles are deposited first.

In some embodiments, the process comprises the steps of
(A) forming a precursor A comprising the support material and the first particles by
  (i) depositing Pt onto the support material to form a first precursor;
  (ii) optionally depositing an alloying metal X1 onto the first precursor to form a second precursor; and annealing the first precursor and second precursor;
  to form the precursor A; and
(B) forming a precursor B comprising the support material and the second particles by
  (i) depositing a second metal onto the support material to form a third precursor; or
  (ii) depositing Ir and X2 onto the support material to form a fourth precursor; and annealing the fourth precursor
  to form the precursor B; or
(C) forming a precursor C comprising the support material and the third particles by
  (i) depositing a third metal onto the support material to form a fifth precursor;
  (ii) optionally depositing an alloying metal X3 or X4 onto the support material to form a sixth precursor; and annealing the fifth and sixth precursor
  to form the precursor C.

The particles that are deposited first on the support material can be deposited using conventional processing steps known to those skilled in the art for preparing a noble metal/non-noble metal alloy catalyst on a support material. Further details are provided in e.g. WO2013/045894 and WO2014/184546.

The deposition of the subsequent particles may be carried out by a number of processes depending on the material to be deposited. For example, the second metal may be deposited using pre-formed metal or metal-compound containing nanoparticles suspended in solution, for example using a process analogous to that described in WO2005/123255 where a colloidal solution of platinum group metal oxide is contacted with the supported alloy material, followed by a reduction step. The use of pre-formed particles avoids any requirement for a subsequent high temperature heat treatment step and therefore means that these particles will not interact with any particles already formed.

Optionally, an additional step may be performed after the deposition of any particles which include an alloy (e.g. the first particles if these are Pt alloyed with an alloying metal X1, the second particles if these include IrX2, and the third particles if these are AuX3 or PdX4), in which the relevant precursor is subjected to an acid wash to remove any excess/unalloyed alloying metal. Examples of acid washing are well known to those skilled in the art. For example, the third precursor may be treated with 0.5M sulphuric acid for up to 24 hours. In addition, or alternatively, this optional step removes (leaches) a portion of the alloying metal from the surface of the alloy to leave the surface of the nanoparticles rich in the first metal (a so-called 'de-alloyed' particle). This additional step may suitably be performed after deposition of each kind of particle which includes an alloy.

The invention further provides an electrocatalyst material obtainable by the process described herein.

The electrocatalyst materials of the invention have first particles and second or third particles located on a single individual support particle or aggregate of the support material and thus the first particles and second or third particles are in close proximity to each other. Surprisingly, the present inventors have discovered that such a configuration, in contrast to that described in WO2014/105407 and shown schematically in FIG. 1B, provides an improved performance benefit for a membrane electrode assembly (MEA) incorporating such electrocatalyst material at the anode.

Thus, the catalysts described herein have particular use in a catalyst layer and in particular an anode catalyst layer, for example for use in a gas diffusion electrode of an electrochemical cell, such as a fuel cell, in particular a PEMFC, or in a catalyst coated ion-conducting membrane of a PEMFC. Thus, there is further provided a catalyst layer comprising the electrocatalyst material described herein. Furthermore, there is provided the use of the electrocatalyst material described herein at the cathode or anode, suitably the anode, of a fuel cell.

Other Options

The catalyst layer may comprise additional components. Such components include, but are not limited to: an ion-conducting polymer, such as a proton conducting polymer, included to improve the ionic conductivity within the layer; a hydrophobic additive (e.g. a polymer such as polytetrafluoroethylene (PTFE) or an inorganic solid with or without surface treatment) or a hydrophilic additive (e.g. a polymer of an inorganic solid, such as an oxide) to control reactant and water transport characteristics. The choice of additional components is within the capability of the skilled person to determine.

To prepare the catalyst layer, the electrocatalyst material of the invention and any additional components are dispersed in an aqueous and/or organic solvent to prepare a catalyst ink. If required, agglomerate particle break-up is carried out by methods known in the art, such as high shear mixing, milling, ball milling, passing through a microfluidiser etc. or a combination thereof, to achieve a suitable particle size distribution of the electrocatalyst. Typically, the ink may contain an ionomer.

After preparation of the catalyst ink, the ink is deposited onto a substrate (e.g. gas diffusion layer, ion-conducting membrane or a carrier/transfer substrate) to form the catalyst layer. The ink may be deposited by any suitable technique known to those in the art, including but not limited to gravure coating, slot die (slot, extrusion) coating, screen printing, rotary screen printing, inkjet printing, spraying, painting, bar coating, pad coating, gap coating techniques such as knife or doctor blade over roll, and metering rod application.

The characteristics of the catalyst layer, such as the thickness, electrocatalyst loading, porosity, pore size distribution, average pore size and hydrophobicity will depend on the use.

For use at the anode, the thickness of the catalyst layer is suitably ≥2 µm; preferably ≥5 µm; and suitably ≤20 µm; more suitably ≤15 µm.

For use at the anode, the total loading of the first metal and second or third metal (in the units following referred to as 'metal') in the catalyst layer is from 0.05 mg metal/cm$^2$ to 0.4 mg metal/cm$^2$, suitably 0.05 mg metal/cm$^2$ to 0.2 mg metal/cm$^2$ and preferably 0.05 mg metal/cm$^2$ to 0.15 mg metal/cm$^2$. It should be noted that the loading of any alloying metal is not included in this catalyst layer loading determination.

The catalyst layer may be deposited onto a gas diffusion layer to form a gas diffusion electrode, suitably an anode. Thus, a further aspect of the invention provides a gas diffusion electrode comprising a gas diffusion layer and a catalyst layer of the invention. The gas diffusion layers are suitably based on conventional gas diffusion substrates. Typical substrates include non-woven papers or webs comprising a network of carbon fibres and a thermoset resin binder (e.g. the TGP-H series of carbon fibre paper available from Toray Industries Inc., Japan or the H2315 series available from Freudenberg FCCT KG, Germany, or the Sigracet® series available from SGL Technologies GmbH, Germany or AvCarb® series from AvCarb Material Solutions), or woven carbon cloths. The carbon paper, web or cloth may be provided with a pre-treatment prior to fabrication of the electrode and being incorporated into a MEA either to make it more wettable (hydrophilic) or more wet-proofed (hydrophobic). The nature of any treatments will depend on the type of fuel cell and the operating conditions that will be used. The substrate can be made more wettable by incorporation of materials such as amorphous carbon blacks via impregnation from liquid suspensions, or can be made more hydrophobic by impregnating the pore structure of the substrate with a colloidal suspension of a polymer such as PTFE or polyfluoroethylenepropylene (FEP), followed by drying and heating above the melting point of the polymer. For applications such as the PEMFC, a microporous layer may also be applied to the gas diffusion substrate on the face that will contact the electrocatalyst layer. The microporous layer typically comprises a mixture of a carbon black and a polymer such as polytetrafluoroethylene (PTFE).

Alternatively, the catalyst layer is deposited onto an ion-conducting membrane, either by direct coating of a catalyst ink onto the membrane, or indirectly by transfer from a carrier or transfer substrate, to form a catalyst coated ion-conducting membrane. Thus, a further aspect of the invention provides a catalyst coated ion-conducting membrane comprising an ion-conducting membrane and a catalyst layer of the invention. The ion-conducting membrane may be any membrane suitable for use in a PEMFC, for example the membrane may be based on a perfluorinated sulphonic acid material such as Nafion™ (Chemours Company), Aquivion® (Solvay Specialty Polymers), Flemion® (Asahi Glass Group) and Aciplex™ (Asahi Kasei Chemicals Corp.). Alternatively, the membrane may be based on a sulphonated hydrocarbon membrane such as those available from FuMA-Tech GmbH as the Fumapem® P, E or K series of products, JSR Corporation, Toyobo Corporation, and others. Alternatively, the membrane may be based on polybenzimidazole doped with phosphoric acid which will operate in the range 120° C. to 180° C.

The ion-conducting membrane component may comprise one or more materials that confer mechanical strength to the ion-conducting membrane component. For example, the ion-conducting membrane component may contain a porous reinforcing material, such as an expanded PTFE material or a nanofiber network.

The ion-conducting membrane may comprise one or more hydrogen peroxide decomposition catalysts either as a layer on one or both faces of the membrane or embedded within the membrane. Examples of the hydrogen peroxide decomposition catalyst suitable for use are known to those skilled in the art and include metal oxides, such as cerium oxides, manganese oxides, titanium oxides, beryllium oxides, bismuth oxides, tantalum oxides, niobium oxides, hafnium oxides, vanadium oxides and lanthanum oxides; suitably cerium oxides, manganese oxides or titanium oxides; preferably cerium dioxide (ceria).

The ion-conducting membrane component may optionally comprise a recombination catalyst, in particular a catalyst for the recombination of unreacted $H_2$ and $O_2$, which gases can diffuse into the membrane from the anode and cathode respectively, to produce water. Suitable recombination catalysts comprise a metal (such as platinum) on a high surface area oxide support material (such as silica, titania, zirconia). More examples of recombination catalysts are disclosed in EP0631337 and WO00/24074.

Alternatively, the catalyst layer is deposited onto a carrier/transfer substrate, by direct coating of a catalyst ink onto the carrier/transfer substrate, to form a catalysed carrier/transfer substrate. Thus, an alternative aspect of the invention provides a catalysed carrier/transfer substrate comprising a carrier/transfer substrate and a catalyst layer of the invention. The carrier/transfer substrate is intended to be removed from the layer in a subsequent step. For example, the catalyst layer may be transferred, by decal transfer, to a gas diffusion layer or ion-conducting membrane, the carrier/transfer substrate being removed immediately after, or at some point subsequent to, the transfer process.

Additional layers may be deposited on the exposed face of the catalyst layer prior to removal of the carrier/transfer substrate; for example, an ion-conducting ionomer layer may be applied from a dispersion of ionomer using any suitable deposition technique known as described above in relation to deposition of the catalyst layer. Further additional layers can be added as required, for example as described in UK Patent Application No. 1405210.4. The carrier/transfer substrate is removed from the catalyst layer at an appropriate time. The carrier/transfer substrate may be formed from any suitable material from which the catalyst layer can be removed without damage thereto. Examples of suitable materials include a fluoropolymer, such as polytetrafluoroethylene (PTFE), ethylene tetrafluoroethylene (ETFE), perfluoroalkoxy polymer (PFA), fluorinated ethylene propylene (FEP—a copolymer of hexafluoropropylene and tetrafluoroethylene) and polyolefins, such as biaxially oriented polypropylene (BOPP).

The invention further provides an MEA comprising a catalyst layer, a gas diffusion electrode or a catalyst coated ion-conducting membrane of the invention and an electrochemical device, such as a fuel cell, comprising a MEA, catalyst layer, gas diffusion electrode or catalysed membrane of the invention. In particular, the invention provides a MEA comprising a cathode catalyst layer comprising: a catalyst layer, a proton exchange membrane; and an anode catalyst layer comprising an electrocatalyst material of the present invention, wherein the proton exchange membrane is sandwiched between the cathode catalyst layer and the anode catalyst layer. The cathode catalyst layer may be any catalyst layer (conventional or otherwise) known to be of use at the cathode.

In particular, the invention further provides a MEA comprising: an anode catalyst layer comprising an electrocatalyst material of the invention wherein the first particles consist of platinum and the second particles consist of iridium and the support material comprises no other kinds of nanoparticles dispersed thereon. The MEA may further include a proton exchange membrane; and a cathode catalyst layer, wherein the proton exchange membrane is sandwiched between the anode catalyst layer and the cathode catalyst layer. The cathode catalyst layer may be any catalyst layer (conventional or otherwise) know to be of use at the cathode.

Although the invention is described with reference to its use in a PEMFC, it can be understood that the electrocatalyst material of the invention will have application in other types of fuel cells where the properties of the inventive electrocatalyst material can lead to improved fuel cell performance and/or stability. In addition, the electrocatalyst material of the invention may find application in other electrochemical devices, and in particular in water electrolysis cells where the oxygen evolution reaction is the primary reaction at the anode. In addition, the electrocatalyst material of the invention may find application in non-electrochemical devices.

The invention will be further described with reference to the following examples which are illustrative and not limiting of the invention which is defined by the claims.

EXAMPLES

Example 1—Synthesis of Pt/Ir/C Catalyst 20.15 g carbon black was slurried in 1 L demineralised water and dispersed with a Silverson mixer. 1.5 g (0.0178 mol) sodium hydrogen carbonate was added to the carbon/water mix and heated to reflux for 1 h. The mix was allowed to cool and then 2.0 g iridium trichloride (1.05 g, 0.0054 mol Ir) dissolved in 100 mL demineralised water was added. The mixture was then reheated to reflux for 1 h. The resulting mixture was allowed to cool to 80° C. 30 mL of 1% formaldehyde was added, and then the resulting mixture was heated to reflux for 10 mins before being allowed to cool with stirring overnight. The Ir/C catalyst was then filtered and washed until the conductivity of the filtrate was below 20 mS.

The Ir/C catalyst was slurried in 1500 mL demineralised water and 14.2 g Pt was added as a tetraethylammonium hydroxide stabilised dispersion of Pt hydroxide in water prepared using a method analogous to that described in WO/2005/123255. The mixture was stirred overnight and afterwards heated to 60° C. and 400 mL 1% formaldehyde added. The mixture was heated to 80° C. for 10 min and allowed to cool. Filtered and washed to <20 µS. The resulting Pt/Ir/C catalyst was dried overnight at 105° C.

Figure 2A:
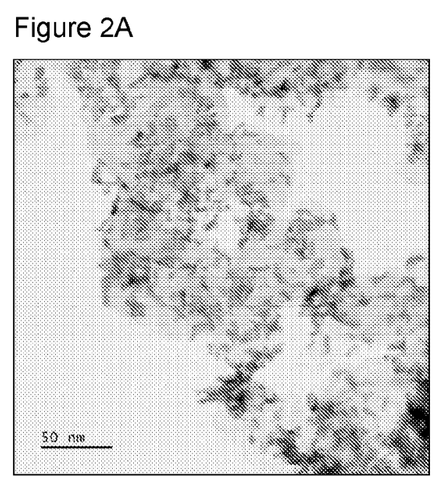
FIGS. 2A, 2B and 2C are transmission electron micrograph (TEM) images of an electrocatalyst material according to the claims having nanoparticles of Ir and Pt on a carbon aggregate support collected on the Harwell JEOL-ARM200 Probe-Corrected Transmission Electron Microscope at 200 kV. Scale bars are 50 nm (FIG. 2A), 20 nm (FIG. 2B) and 5 nm (FIG. 2C).
Figure 2B:
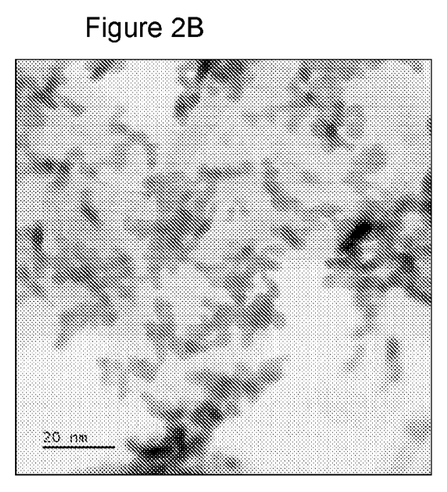
Figure 2C:
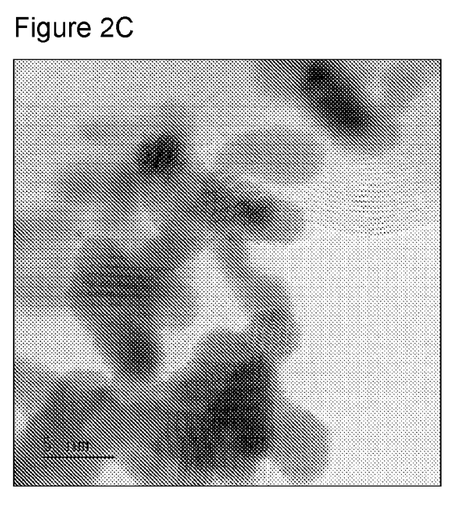

The resulting material can be seen in FIGS. 2A-2C. The individual particles are visible on the primary particles of the carbon that form the aggregates of the support.

Figure 3A:
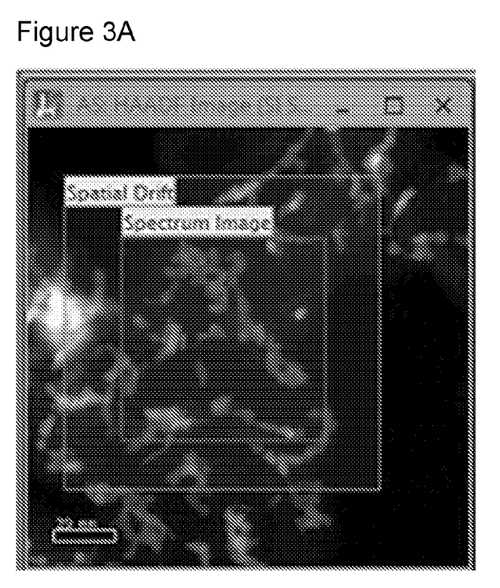
FIG. 3A is a high angle annular dark field (HAADF) image of an electrocatalyst material according to the claims having nanoparticles of Ir and Pt on a carbon aggregate support collected using the above microscope in scanning mode using an annular detector capable of atomic-resolution imaging.
Figure 3B:
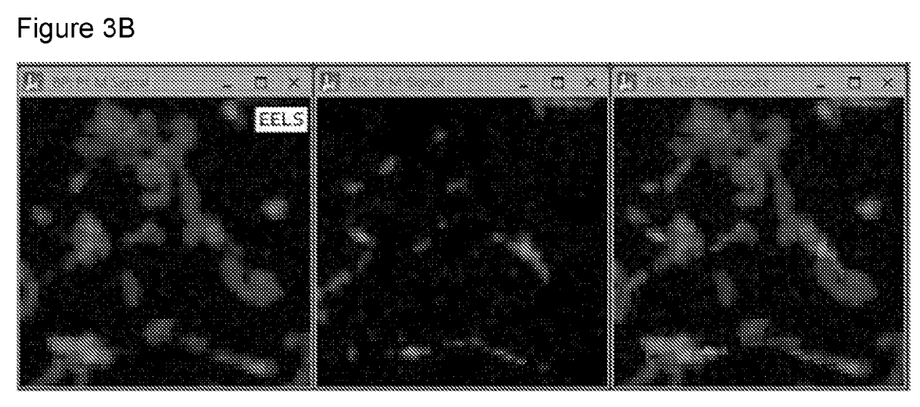
FIG. 3B shows electron energy loss microscopy (EELS) images of the indicated part of FIG. 3A in which the Pt signal is shown in the image on the left hand side image, the Ir signal is shown in the image in the middle and the combined Pt and Ir signals are shown in the image on the right. These were obtained using dual EELS with a GIF quantum energy filter.

As shown in FIGS. 3A-3B, the nanoparticles contain Pt or Ir. Especially FIG. 3B shows that the nanoparticles are clearly separated (and not alloyed) because the Pt signal shown in the left-most image is distinct from the Ir signal that can be seen in the middle image. The composite image of the Pt and Ir signals shown on the far right is evidence that the two kinds of nanoparticles remain separate.

Comparative Example 1—Pt/C Catalyst

The comparative example is a 60% Pt/C commercial catalyst available from Johnson Matthey PLC.

Electrode Fabrication

Commercially available gas diffusion layer with a carbon microporous layer (Toray TGP60) of 3 $cm^2$ active area were coated via spray coating with the Pt/Ir/C and 60% Pt/C catalysts (those of Example 1 and Comparative Example 1, respectively). To make a catalyst layer, 0.12 g of the 40% Pt/3% Ir/C catalyst powder was mixed with (0.21 g) of aqueous Nafion® 1100 EW ionomer to give a carbon/ionomer ratio of 0.8. The mixture was then stirred at 3000 rpm for 10 min. The resulting ink was then coated via spray coating to the gas diffusion electrode. The electrode loading was measured by weight difference until the desired loading of 0.1 mg Pt/$cm^2$ was obtained with this loading being confirmed by multipoint x-ray fluorescence (XRF) measurements. The button electrode was pre-treated in 0.1M sulphuric acid under vacuum to enable full penetration of the acid electrolyte into the porous structure of the electrode.

Electrochemical Performance Testing

The catalyst performance was assessed in a three electrode jacketed electrochemical cell using a homemade hydrogen reference electrode and platinum foil as the counter electrode. Sulphuric acid at 0.5M concentration in water was used as the electrolyte. Nitrogen was sparged at 100 mL for 30 min to eliminate dissolved oxygen in the electrolyte. The cell temperature was controlled by recirculating water through the jacketed cell at a temperature of 25 C. Afterwards the electrode voltage was scanned from 0.0 V to 1.6 V vs RHE at a scan rate of 10 mV/S.

Figure 4:
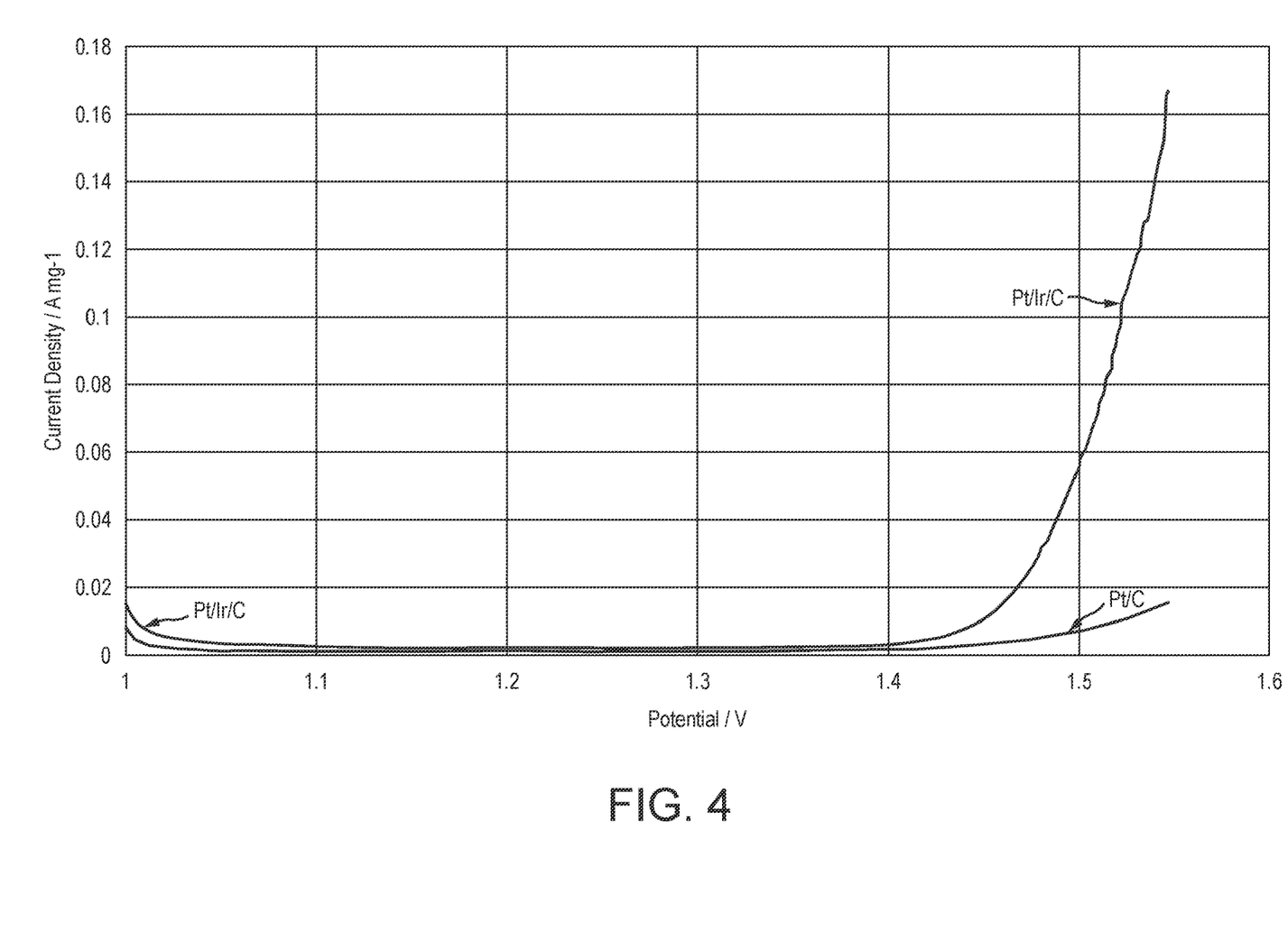
FIG. 4 is a plot showing voltage vs current density of (i) a MEA comprising an electrocatalyst material according to the claims having Pt and Ir nanoparticles on a carbon aggregate support and (ii) a MEA comprising an electrocatalyst material having Pt nanoparticles on a carbon aggregate support.

The results of the electrochemical performance testing are shown in FIG. 4. The uppermost trace shows the results of the Pt/Ir/C catalyst of example 1. The lowermost trace shows the results of the commercially available Pt/C.

These results indicate that the Pt/Ir/C electrocatalytic material shows improved current density at higher potential compared with the commercially available Pt/C catalyst. Thus, it is considered that the close proximity of the Ir particles assists in minimising corrosion of the anode material and thus the Ir particles show a protective effect over the Pt particles.

A non-exhaustive list of aspects of the invention is provided in the following numbered clauses:

1. The use of an electrocatalyst material in an anode catalyst, wherein the electrocatalyst material comprises a support material, the support material comprising a plurality of individual support particles or aggregates wherein each individual support particle or aggregate has dispersed thereon (i) first particles and (ii) second particles, wherein:
    (i) the first particles comprise Pt optionally alloyed with an alloying metal X1;
        wherein the optional alloying metal X1 is selected from the group consisting of Rh, Ti, Os, V, Co, Ni, Ga, Hf, Sn, Ir, Pd, Mo, Zn, W, Zr and Re;
    (ii) the second particles consist essentially of a second metal or a second metal compound wherein the second metal is selected from the group consisting of Ir and Ru and the second metal compound comprises IrX2 wherein X2 is selected from the group consisting of Ta, Nb, Ru, Ni and Co; and
wherein if the first particles consist of Pt then the second particles do not comprise IrTa; and wherein if the first particles consist of Pt without alloying metal X1 and the second particles consist essentially of a second metal which is Ir, each individual support particle or aggregate of the support material of the electrocatalyst material has dispersed thereon only the said first and second particles.
2. Use according to any one of the preceding clauses, wherein X1 is selected from the group consisting of Rh and Os.
3. Use according to any one of the preceding clauses wherein X2 is selected from the group consisting of Ta, Nb and Ru.
4. Use according to any one of the preceding clauses, wherein the second particles consist essentially of IrX2.
5. Use according to any one of the preceding clauses, wherein the first particles comprise Pt without X1.
6. Use according to clause 5, wherein each individual support particle or aggregate of the support material of the electrocatalyst material has dispersed thereon only first and second particles, the first particles comprising Pt without X1 and the second particles consisting essentially of a second metal which is Ir.
7. Use according to any one of clauses 1 to 4, wherein the electrocatalyst material comprises first particles consisting of Pt alloyed with Rh; and second particles consisting essentially of a second metal which is Ir, preferably consisting of Ir.
8. The use of an electrocatalyst material in an anode catalyst, wherein the electrocatalyst material comprises a support material, the support material comprising a plurality of individual support particles or aggregates wherein each individual support particle or aggregate has dispersed thereon (i) first particles and (ii) third particles, wherein:
    (i) the first particles comprise Pt optionally alloyed with an alloying metal X1;
        wherein the optional alloying metal X1 is selected from the group consisting of Rh, Ti, Os, V, Co, Ni, Ga, Hf, Sn, Ir, Pd, Mo, Zn, W, Zr and Re;
    (ii) the third particles comprise Au or a third metal alloy;
        wherein the third metal alloy is selected from the group consisting of AuX3 and PdX4, wherein X3 is selected from the group consisting of Pt, Pd, Cu, Ir and Sn; and X4 is selected from the group consisting of Hg, Au, Sn, Co, Ni, Ga, In, Zn, W and Pb.
9. Use according to clause 8, wherein X1 is selected from the group consisting of Rh and Os.
10. Use according to clause 8, wherein the first particles comprise Pt without X1.
11. Use according any one of clauses 8 to 10, wherein X3 is chosen from Pd and Sn, and wherein X4 is chosen from Au and Sn.
12. Use according to any one of the preceding clauses, wherein the ratio of first metal to alloying metal X1 is from 5:1 to 1:5.
13. Use according to any one of the preceding clauses, wherein the first particles have a mean average particle size in the range of from 2 to 14 nm.
14. Use according to any one of the preceding clauses, wherein the second and/or third particles have a mean average particle size in the range of from 0.5 to 10 nm.
15. Use according to any one of clauses 1 to 14 in an electrochemical cell, optionally wherein the electrochemical cell is a fuel cell.
16. An electrocatalyst material for use according to any one of clauses 1-7 or 12-15 wherein the electrocatalyst material comprises a support material, the support material comprising a plurality of individual support particles or aggregates wherein each individual support particle or aggregate has dispersed thereon (i) first particles and (ii) second particles, wherein:
    (iii) the first particles comprise Pt optionally alloyed with an alloying metal X1;
        wherein the optional alloying metal X1 is selected from the group consisting of Rh, Ti, Os, V, Hf, Sn, Pd, Mo, W, Zr and Re; and
    (iv) the second particles are defined as follows:
        a. second particles consist essentially of Ru or a second metal compound comprising IrX2 wherein X2 is selected from the group consisting of Ta, Nb, Ru, Ni and Co; and
wherein if the first particles consist of Pt then the second particles do not comprise IrTa.
17. An electrocatalyst material for use according to any one of clauses 8-15 wherein the electrocatalyst material comprises a support material, the support material comprising a plurality of individual support particles or aggregates wherein each individual support particle or aggregate has dispersed thereon (i) first particles and (ii) third particles, wherein:
    (iii) the first particles comprise Pt optionally alloyed with an alloying metal X1;
        wherein the optional alloying metal X1 is selected from the group consisting of Rh, Ti, Os, V, Hf, Sn, Pd, Mo, W, Zr and Re; and
    (iv) the third particles comprise a third metal alloy;
        wherein the third metal alloy is selected from the group consisting of AuX3 and PdX4, wherein X3 is selected from the group consisting of Pt, Pd, Cu, Ir and Sn; and X4 is selected from the group consisting of Hg, Au, Sn, Co, Ga, In, Zn, W and Pb.
18. A process for the preparation of an electrocatalyst material according to any one of clauses 16 or 17, or for the use according to any one of clauses 1 to 15, said process comprising the steps of:
(A) forming a precursor A comprising the support material and the first particles by
  (iii) depositing Pt onto the support material to form a first precursor;
  (iv) optionally depositing an alloying metal X1 onto the first precursor to form a second precursor; and annealing the first precursor and second precursor; to form the precursor A; and
(B) forming a precursor B comprising the support material and the second particles by
  (iii) depositing a second metal onto the support material to form a third precursor; or
  (iv) depositing Ir and X2 onto the support material to form a fourth precursor; and annealing the fourth precursor
  to form the precursor B; or
(C) forming a precursor C comprising the support material and the third particles by
  (iii) depositing a third metal onto the support material to form a fifth precursor;
  (iv) optionally depositing an alloying metal X3 or X4 onto the support material to form a sixth precursor; and annealing the fifth and sixth precursor
  to form the precursor C;
wherein steps (A), (B) and (C) can be carried out in any order, preferably wherein step (A) is carried out before step (B) and/or step (C).

19. A process according to clause 18, wherein step (B) and/or step (C) comprises depositing the second metal or second metal compound, or depositing the third metal or third metal alloy using pre-formed metal or metal alloy nanoparticles suspended in solution.

20. A process according to any one of clauses 18 or 19, comprising an additional step after any of annealing steps (A)(ii), (B)(ii) and/or (C)(ii), in which the precursor A, B or C is subjected to an acid wash prior to any subsequent depositing step (A)(i), (B)(i) and/or (C)(i).

21. A catalyst layer comprising an electrocatalyst material according to any one of clauses 16 and 17, optionally wherein the catalyst layer is an anode catalyst layer.

22. A gas diffusion electrode comprising a gas diffusion layer and a catalyst layer according to clause 21.

23. A catalyst coated ion-conducting membrane comprising an ion-conducting membrane and a catalyst layer according to clause 21.

The invention claimed is:

1. An electrocatalyst material for an anode catalyst, wherein the electrocatalyst material comprises a support material, wherein the support material consists of carbon and comprises a plurality of individual support particles or aggregates, wherein the individual support particles or aggregates have a mean particle or aggregate size of 5-500 nm, wherein each individual support particle or aggregate is in direct contact with and has dispersed thereon separate (i) first particles and (ii) second particles, and wherein the first particles are separate from the second particles:
  (i) the first particles consist of Pt;
  (ii) the second particles consist essentially of a second metal
    wherein the second metal is Ir; and
    each individual support particle or aggregate of the support material of the electrocatalyst material has dispersed thereon only the said first and second particles.

2. The electrocatalyst material according to claim 1, wherein the first particles have a mean average particle size in the range of from 2 to 14 nm.

3. The electrocatalyst material according to claim 1, wherein the second particles have a mean average particle size in the range of from 0.5 to 10 nm.

4. The electrocatalyst material according to claim 1 in an electrochemical cell.

5. An anode catalyst comprising the electrocatalyst material according to claim 1.

6. The electrocatalyst material according to claim 4, wherein the electrochemical cell is a fuel cell.

* * * * *